US012669967B2

(12) United States Patent
Aizono

(10) Patent No.: US 12,669,967 B2
(45) Date of Patent: Jun. 30, 2026

(54) INFORMATION PROCESSING APPARATUS AND SYSTEM FOR TRANSMITTING CAPABILITY CHANGE NOTIFICATION FOR CHANGING CAPABILITY CORRESPONDING TO DIFFERENT CONTRACT PLAN TO IMAGE FORMING APPARATUS

(71) Applicant: CANON KABUSHIKI KAISHA, Tokyo (JP)

(72) Inventor: Keisuke Aizono, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 18/603,637

(22) Filed: Mar. 13, 2024

(65) Prior Publication Data

US 2024/0345779 A1 Oct. 17, 2024

(30) Foreign Application Priority Data

Apr. 13, 2023 (JP) ................................ 2023-065581

(51) Int. Cl.
*G06F 3/12* (2006.01)

(52) U.S. Cl.
CPC .......... *G06F 3/1205* (2013.01); *G06F 3/1267* (2013.01); *G06F 3/1269* (2013.01); *G06F 3/1296* (2013.01)

(58) Field of Classification Search
None
See application file for complete search history.

(56) References Cited

U.S. PATENT DOCUMENTS

2002/0049839 A1* 4/2002 Miida ................. G06F 11/3013 709/224
2012/0105877 A1* 5/2012 Wakamatsu .......... G06F 3/1208 358/1.9
2020/0225885 A1* 7/2020 Akimoto ................ G06Q 30/06
2021/0303225 A1* 9/2021 Shirai ................. H04L 43/0811
2022/0100436 A1* 3/2022 Suzuki ............... G06K 15/4075
2022/0321729 A1* 10/2022 Hirose .................. G06F 3/1224

FOREIGN PATENT DOCUMENTS

JP 2021005005 A 1/2021

OTHER PUBLICATIONS

Machine Translation in English of JP Pub 2021005005 A to Watanabe et al.*

* cited by examiner

*Primary Examiner* — Haris Sabah
(74) *Attorney, Agent, or Firm* — ROSSI, KIMMS & McDOWELL LLP

(57) ABSTRACT

A mechanism that enables a user to easily use an image forming apparatus having a desired capability. Accordingly, an aspect of the present invention provides an information processing apparatus including a holding unit that holds contract information including information about a contracted plan selected by a user from among subscription plans that use an image forming apparatus, and a unit that transmits, in receiving a plan change notification for requesting a change from the contracted plan to a different plan involving a change in a capability of the image forming apparatus, a capability change notification for changing the capability of the image forming apparatus to a capability corresponding to the different plan to the image forming apparatus.

18 Claims, 16 Drawing Sheets

| User ID (202) | Password (203) | Address (204) | Payment Means (205) |
|---|---|---|---|
| user01 | xxxx | Tokyo Prefecture xxx | Credit Card |
| user02 | yyyy | Ibaraki Prefecture xxx | Direct Debit |
| ⋮ | ⋮ | ⋮ | ⋮ |

| Serial Number (212) | User ID (213) | Current Plan (214) | Reserved Plan (215) | Plan Change Date (216) | Billed Amount (217) |
|---|---|---|---|---|---|
| AAA00001 | user01 | Plan A | Plan C | 2023/06/01 | ¥3,000 |
| AAA00002 | user01 | Plan B | – | – | ¥4,000 |
| AAA00003 | user02 | Plan C | – | – | ¥5,000 |
| ⋮ | ⋮ | ⋮ | ⋮ | ⋮ | ⋮ |

FIG. 2C

| | Print Speed (Pages/Minute) | Print Upper Limit (Pages/Month) | Color Print | Fee (Yen/Month) |
|---|---|---|---|---|
| Plan A | 30 | 300 | Black and White Only | 3000 |
| Plan B | 40 | 500 | Black and White, Color | 4000 |
| Plan C | 50 | 700 | Black and White, Color | 5000 |

431

Change of plan has been accepted.

Target Device: AAA00001

(Before change)     Plan A(Print Speed: 30 ppm, Upper Limit: 300 Pages, B&W only) ¥3,000/Month (After change)     Plan C(Print Speed: 50 ppm, Upper Limit: 700 Pages, Color) ¥5,000/Month Plan change date            2023/06/01

| OK |
|---|

| 801 | 802 | 803 | 804 | 805 | 806 | 807 |
|---|---|---|---|---|---|---|
| Current Plan | Reserved Plan | Plan Change Date | Print Speed | Color Mode | Upper Limit Number of Print Pages | Number of Used Pages |
| Plan A | - | - | 30ppm | B&W Only | 300 Pages | 100 Pages |

FIG. 8B

| 801 | 802 | 803 | 804 | 805 | 806 | 807 |
|---|---|---|---|---|---|---|
| Current Plan | Reserved Plan | Plan Change Date | Print Speed | Color Mode | Upper Limit Number of Print Pages | Number of Used Pages |
| Plan A | Plan C | 2023/06/01 | 30ppm | B&W Only | 300 Pages | 200 Pages |

FIG. 8C

| 801 | 802 | 803 | 804 | 805 | 806 | 807 |
|---|---|---|---|---|---|---|
| Current Plan | Reserved Plan | Plan Change Date | Print Speed | Color Mode | Upper Limit Number of Print Pages | Number of Used Pages |
| Plan C | - | 2023/06/01 | 50ppm | Color | 700 Pages | 0 Pages |

901

■ Information

Plan A will be changed to Plan C in 2023/06/01.

Before Change:
Plan A(Print Speed: 30 ppm, Upper Limit: 300 Pages, B&W only)

After change:
Plan C(Print Speed: 50 ppm, Upper Limit: 700 Pages, Color)

Close

911

■ Information

Plan A has been changed to Plan C.

Before Change:
Plan A(Print Speed: 30 ppm, Upper Limit: 300 Pages, B&W only)

After Change:
Plan C(Print Speed: 50 ppm, Upper Limit: 700 Pages, Color)

Close

INFORMATION PROCESSING APPARATUS AND SYSTEM FOR TRANSMITTING CAPABILITY CHANGE NOTIFICATION FOR CHANGING CAPABILITY CORRESPONDING TO DIFFERENT CONTRACT PLAN TO IMAGE FORMING APPARATUS

BACKGROUND OF THE INVENTION

Field of the Invention

The present invention relates to an information processing apparatus, a control method therefor, a storage medium storing a control program therefor, and a management system.

Description of the Related Art

Fixed price print services are known. In a fixed price print service, for example, a user can print at a fixed price up to the number of pages corresponding to a contracted plan during a contract period.

Further, a technique that allows a user who purchases a license to change capabilities, such as a print speed, of an image forming apparatus has been proposed (see Japanese Patent Laid-Open Publication No. 2021-5005 (JP 2021-5005A)).

In a fixed price print service, when a user applies for switching to another plan involving a change in capability of an image forming apparatus, it takes time and effort to physically transport another image forming apparatus having a different capability or issue a license for changing the capability to a different capability. In this way, in the prior art, when a user applies for switching to another plan involving a change in capability of an image forming apparatus, the user cannot easily use the image forming apparatus having a desired capability.

SUMMARY OF THE INVENTION

The present invention provides a mechanism that enables a user to easily use an image forming apparatus having a desired capability.

Accordingly, an aspect of the present invention provides an information processing apparatus including a holding unit configured to hold contract information including information about a contracted plan selected by a user from among subscription plans that use an image forming apparatus, and a unit configured to transmit, in receiving a plan change notification for requesting a change from the contracted plan to a different plan involving a change in a capability of the image forming apparatus, a capability change notification for changing the capability of the image forming apparatus to a capability corresponding to the different plan to the image forming apparatus.

According to the present invention, it is possible to allow a user to easily use an image forming apparatus having a desired capability.

Further features of the present invention will become apparent from the following description of exemplary embodiments with reference to the attached drawings.

BRIEF DESCRIPTION OF THE DRAWINGS

FIG. 2A, FIG. 2B, and FIG. 2C are views showing examples of date managed by the contract management server in FIG. 1.

FIG. 8A, FIG. 8B, and FIG. 8C are schematic views for describing management of contract information by the image forming apparatus in FIG. 1.

DESCRIPTION OF THE EMBODIMENTS

Figure 1:
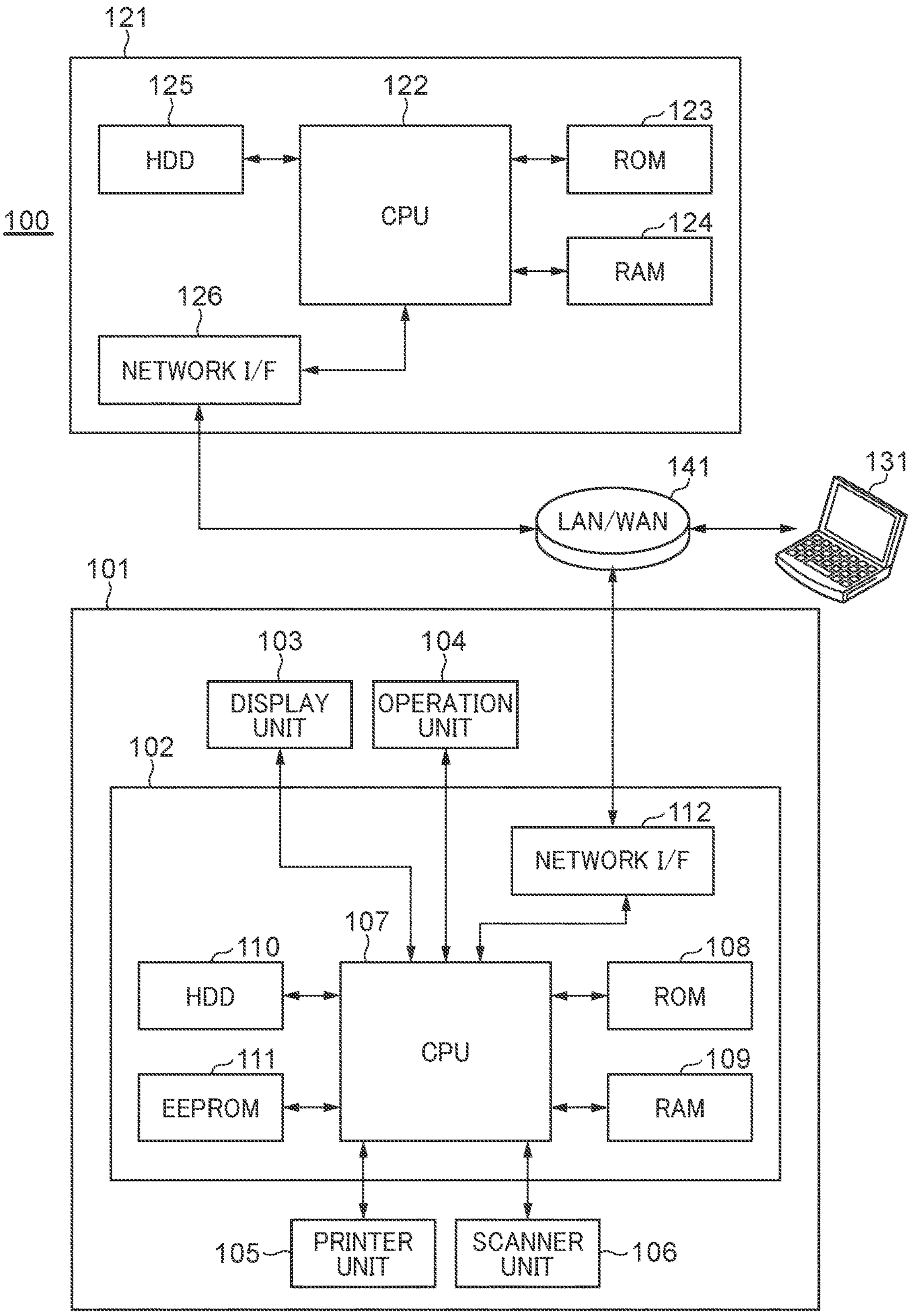
FIG. 1 is a view schematically showing a configuration of a management system including a contract management server as an information processing apparatus according to an embodiment.

Hereafter, embodiments according to the present invention will be described in detail by referring to the drawings. In this embodiment, a configuration, in a fixed price print service, that changes capability of an image forming apparatus according to an instruction from a contract management server in receiving a plan switching application involving a change in the capability of the image forming apparatus will be described.

FIG. 1 is a view schematically showing a configuration of a management system 100 including a contract management server 121 as an information processing apparatus according to this embodiment. The management system 100 includes an image forming apparatus 101, a PC 131 as a communication apparatus, and a contract management server 121 as the information processing apparatus.

The image forming apparatus 101 can communicate with the contract management server 121 via a LAN/WAN 141. The contract management server 121 provides a subscription service for the image forming apparatus. For example, the contract management server 121 provides a fixed price print service. The fixed price print service allows printing up to the number of pages corresponding to a contracted plan at a fixed price during a contract period. The contract management server 121 is managed by a subscription service provider and is connected to the LAN/WAN 141. Thus, the contract management server 121 is communicably connected with the image forming apparatus 101 and the PC 131 via the LAN/WAN 141. It is assumed that a contract for use of the image forming apparatus 101 is made between a user of the image forming apparatus 101 and the subscription service provider with any one of plans A to C described below. The contract management server 121 holds and manages contract information including information about a plan contracted by a user.

The PC 131 updates the contract information managed by the contract management server 121 according to a user operation via a WEB browser. Although the configuration in which the contract information is updated using the WEB browser will be described, this is not limiting. For example, the contract information may be updated by a dedicated application on the PC 131 or the contract information may be updated using an operation unit 104 of the image forming apparatus 101.

Next, a configuration of the image forming apparatus 101 will be described. The image forming apparatus 101 includes a controller unit 102, a display unit 103, the operation unit 104, a printer unit (a print unit) 105, and a scanner unit (a reading unit) 106. The display unit 103 is constituted by LEDs or a liquid crystal display, and displays contents of an operation performed by a user and internal information of the apparatus. The operation unit 104 includes a plurality of operation buttons and accepts operations as various instructions from a user. The operation unit 104 may constitute a touch display panel together with the display unit 103 in addition to the plurality of operation buttons.

The printer unit 105 prints image data received from the controller unit 102 on a sheet according to a print instruction received from the controller unit 102. The printer unit 105 switches the print speed according to a notification received from the controller unit 102. The printer unit 105 can switch the print speed to, for example, 30 ppm (pages per minute), 40 ppm, or 50 ppm. Although the configuration in which the print speed can be switched to any one of 30 ppm, 40 ppm, and 50 ppm has been described as an example in this embodiment, this is not limiting. A configuration in which the print speed can be switched to other print speeds may be employed.

The scanner unit 106 performs a reading operation according to a reading instruction received from the controller unit 102. As modes of the reading operation, there are a pressure plate mode for reading a document placed on a document table having a glass surface and an ADF mode for reading a document conveyed by an automatic document feeder (ADF). In the reading operation, the scanner unit 106 reads a document placed on a document table having a glass surface or a document conveyed by the ADF, and generates image data of the document. The scanner unit 106 transmits the generated image data to the controller unit 102.

The controller unit 102 include a CPU 107, a ROM 108, a RAM 109, an HDD 110, an EEPROM 111, and a network I/F 112. The CPU 107 executes a control program stored in the ROM 108 or the HDD 110 to control operations of devices connected to the controller unit 102. The ROM 108 is a read only memory and stores a boot program necessary for starting up the system of the image forming apparatus 101. The RAM 109 is a volatile memory and is a work memory used when the control program is executed. The HDD 110 is a storage medium, such as a magnetic disc, and stores a control program, image date, etc. The EEPROM 111 is a nonvolatile memory and stores setting values etc. required in executing the control program. The EEPROM 111 also stores capability information of the image forming apparatus 101 including a print speed described below and contract information given from the contract management server 121.

Next, a configuration of the contract management server 121 will be described. The contract management server 121 includes a CPU 122, a ROM 123, a RAM 124, an HDD 125, and a network I/F 126. The contract management server 121 can communicate with the image forming apparatus 101 and the PC 131 via the WAN/LAN 141, and provides a contract information update service for the image forming apparatus 101.

The CPU 122 is a main component to perform a server function of the contract management server 121. The ROM 123 is a read only memory and stores a boot program etc. necessary for starting the system of the contract management server 121. The RAM 124 is a volatile memory and is a work memory used in executing a program of the server function. The HDD 125 is a storage medium like a magnetic disc and stores the program of the server function. The HDD 125 stores user data 201 in FIG. 2A and contract data 211 in FIG. 2B.

The user data 201 includes information about a user who has made a contract with the subscription service provider in any of plans A to C described later. In FIG. 2A, the user information 201 includes a user ID 202, a password 203, an address 204, and a payment means 205. The user ID 202 and password 203 are an ID and a password used for an authentication process in logging in to the contract information update service from the PC 131 etc. The address 204 is an address of a user and is used when a bill or a receipt is issued. The payment means 205 is a means for paying a fee paid when the user uses the image forming apparatus. Specifically, the payment may be made by a credit card or direct debit from a bank account. Although the configuration in which the user data 201 includes the above-described four items will be described in this embodiment, the user data 201 is not limited to the above-described configuration, and may include items other than the above-described four items as long as the items are information related to a user.

The contract data 211 includes contract information for each user. In FIG. 2B, the contract data 211 includes a serial number 212, a user ID 213, a current plan 214, a reserved plan 215, a plan change date 216, and a billed amount 217. The serial number 212 is an ID for uniquely identifying an image forming apparatus. In this embodiment, the contract information is managed on a serial number basis. The user ID 213 is an ID for identifying a user who uses the image forming apparatus corresponding to the serial number 212. The current plan 214 indicates a type of a plan that the user has contracted. In the this embodiment, the plan that the user has contracted is set to the current plan 214 from among the plans A, B, and C shown in FIG. 2C. All of the plans A, B, and C are monthly subscription plans. In each plan, a print speed of the printer unit 105, the upper limit number of print pages per month, color print availability, and a monthly fee are determined. The plans A, B, and C are examples, and a contract may be made with another plan that is different from the plans A, B, and C in at least one of the print speed of the printer unit 105, the upper limit umber of print pages per month, the color print availability, and the monthly fee.

The reserved plan 215 is a plan to be changed on the date set in the plan change date 216. The reserved plan 215 and the plan change date 216 are set when an update instruction of the contract information is received from the PC 131. The billed amount 217 is a billed amount for the use of the image forming apparatus corresponding to the serial number 212. Each user is charged for the sum of the billed amounts for the same user ID. Although the configuration in which the contract data 211 includes the above-described six items will be described in this embodiment, the contract data 211 is not limited to the above-described configuration and may include items other than the above-described six items as long as the items are information related to the contract of the image forming apparatus.

Next, a flow of updating the contract information by the management system 100 according to this embodiment will be described.

Figure 3:
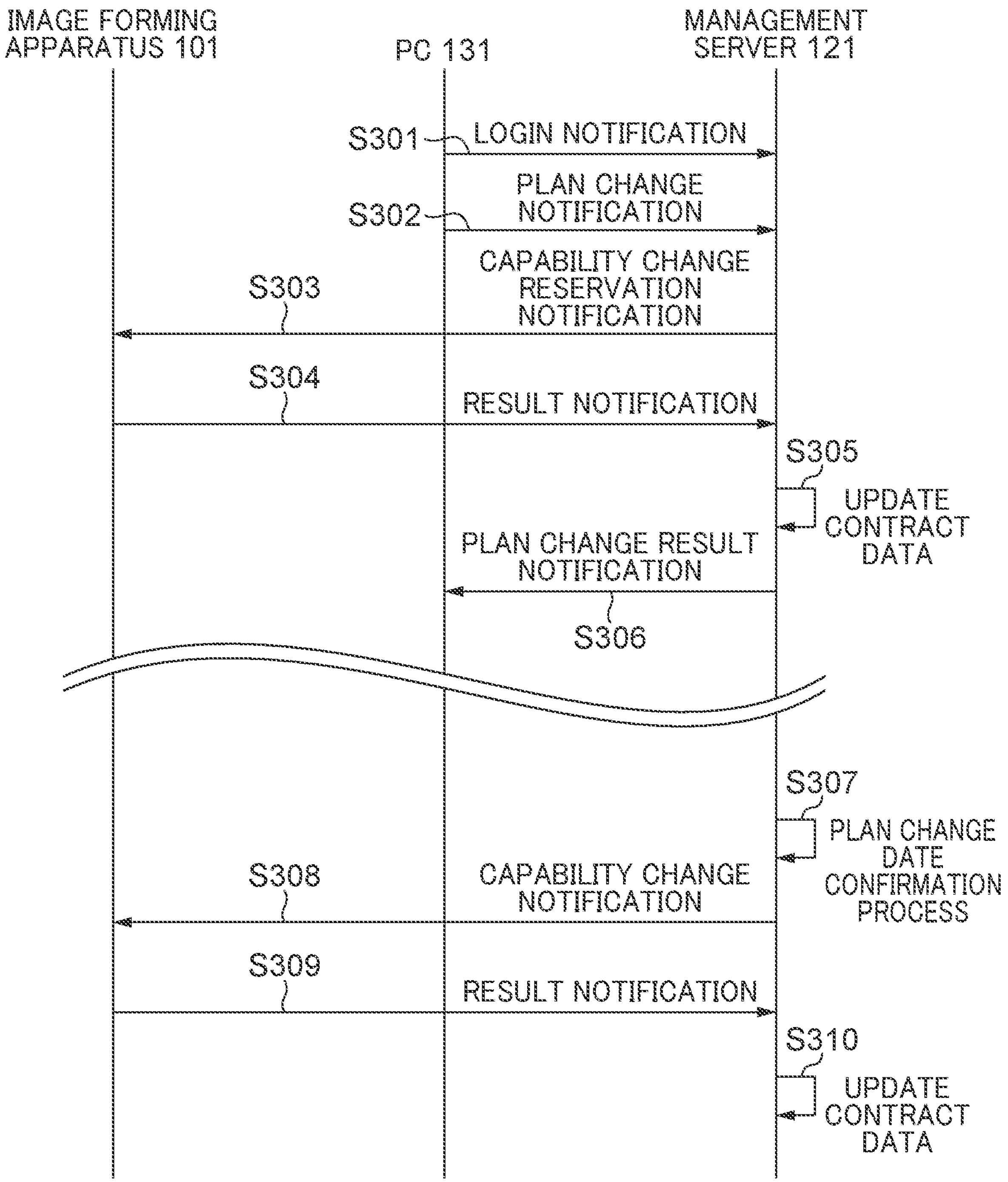
FIG. 3 is a sequence chart showing a procedure of a contract information update process executed by the management system in FIG. 1.
Figure 4A:
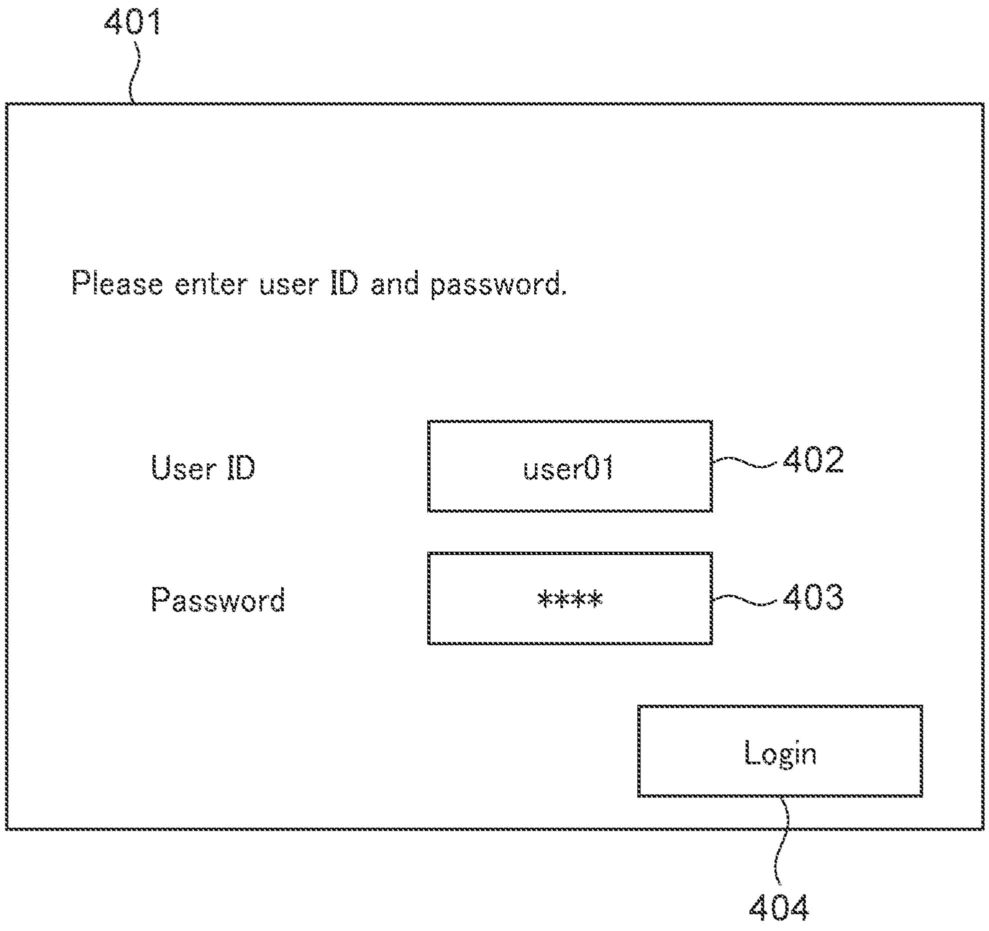
FIG. 4A to FIG. 4E are views showing examples of screens displayed on a WEB browser of a PC in FIG. 1.

FIG. 3 is a sequence chart showing a procedure of a contract information update process executed by the management system 100 in FIG. 1. The contract information update process in FIG. 3 is executed when the user performs a login operation for logging in to the contract information update service. In this embodiment, the user can perform the login operation of the contract information update service on a login screen 401 shown in FIG. 4A. The login screen 401 is a screen displayed on the web browser of the PC 131 and includes a user-ID input area 402, a password input area 403, and a login button 404. When the user respectively inputs a user ID and a password in the user ID input area 402 and the password input area 403, and performs a login operation, such as a press of the login button 404, a process in S (step) 301 is performed.

Figure 4B:
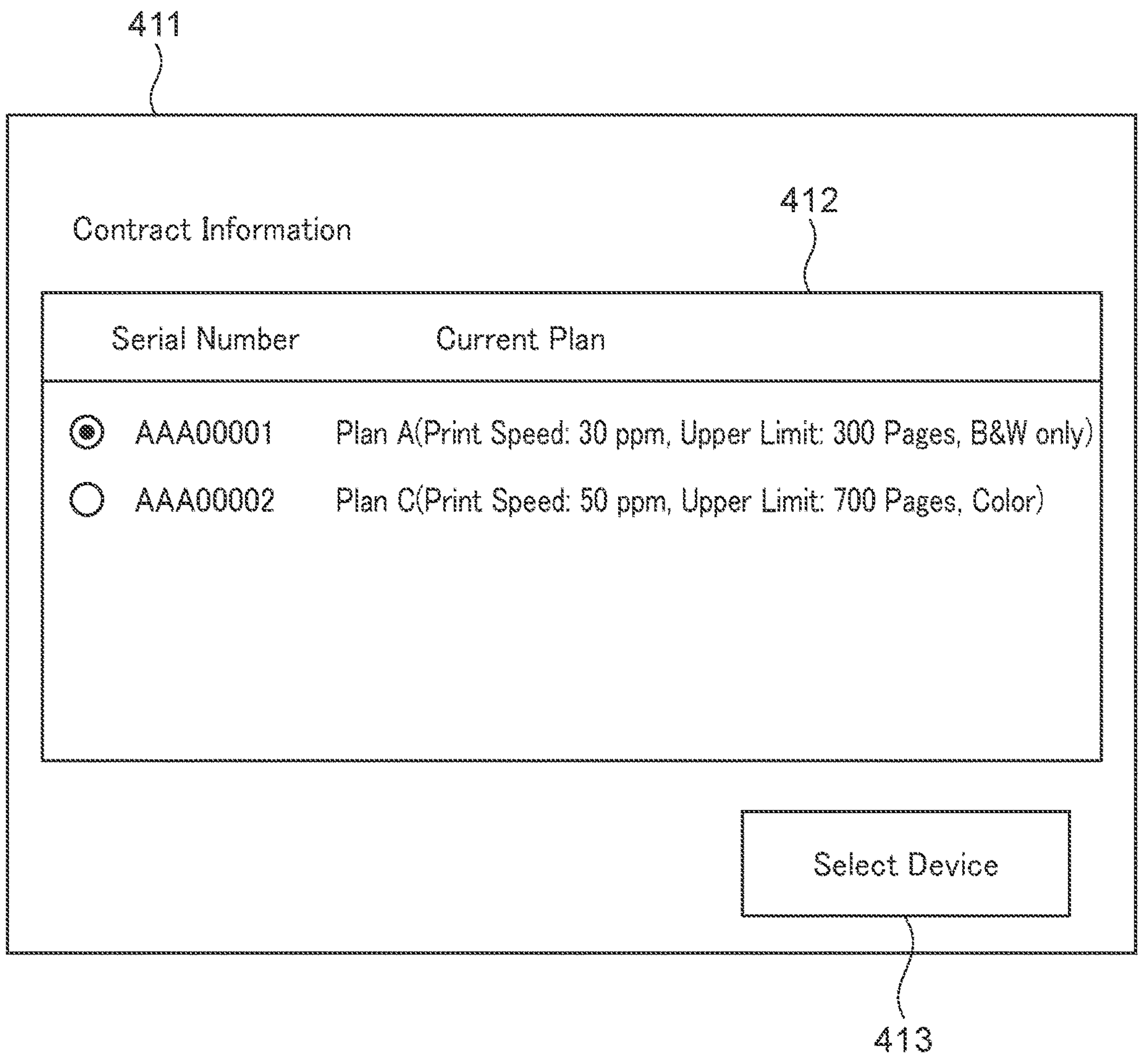

In S301, the PC 131 sends a login notification to the contract management server 121. The login notification is a notification for requesting login to the contract information update service. The login notification includes the user ID and the password input by the user on the login screen 401. When the login to the contract information update service is succeeded based on the login notification, a contract information screen 411 shown in FIG. 4G FIG. 4B is displayed on the WEB browser of the PC 131.

Figure 4C:
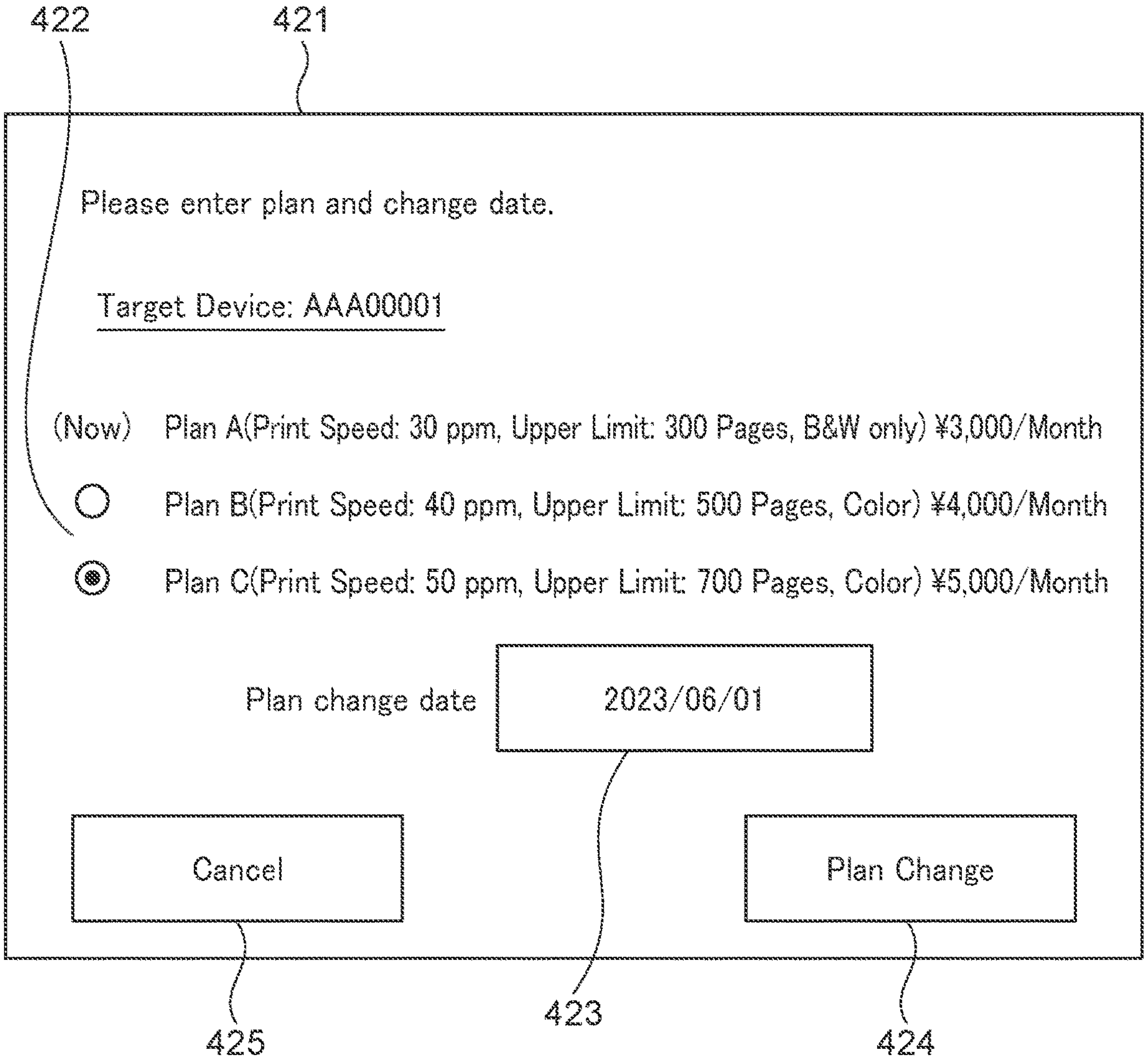

The contract information screen 411 is configured by a contract information list 412 and a device selection button 413. The contract information list 412 displays a list of plans that the login user contracts. The list information includes information indicating the contents of the plans contracted by the login user and the serial numbers of the image forming apparatuses corresponding to the plans. When the user selects the serial number of an apparatus, for example, the image forming apparatus 101, of which the user wants to change the contents of the contract, and selects the device selection button 413, a plan change screen 421 shown in FIG. 4C is displayed on the WEB browser of the PC 131.

The plan change screen 421 includes change plan candidates 422, a plan change date input area 423, a plan change button 424, and a cancel button 425. The plans that can be changed from the contracted plan (hereinafter referred to as a "current plan") in the image forming apparatus 101 corresponding to the serial number selected on the contract information screen 411 are displayed as the change plan candidates 422. For example, when the current plan is the plan A, the plans B and C are displayed as the change plan candidates 422. When the user selects one plan from the change plan candidates 422, inputs the change date to the selected plan in the plan change date input area 423, and presses the plan change button 424, the PC 131 transmits the plan change notification to the contract management server 121 (S302). The plan change notification is a notification requesting a change from the current plan to the plan selected from the change plan candidates 422, and includes information designated by the user on the plan change screen 421.

When receiving the plan change notification, the contract management server 121 transmits a capability change reservation notification to the image forming apparatus 101 (S303). The capability change reservation notification includes information included in the plan change notification. Specifically, the plan change date input in the plan change date input area 423, information indicating the type of the plan selected from the change plan candidates 422, and the information about capabilities, such as a print speed, an upper limit number of print pages, and color print availability, which correspond to the plan are included. By transmitting such a capability change reservation notification, the image forming apparatus 101 is notified that the current plan will changed to the plan selected from among the change plan candidates 422 on the date designated in the plan change date input area 423. This enables the image forming apparatus 101 to display when the plan will be changed on the display unit 103. Moreover, the image forming apparatus 101 can display an alert message indicating that the plan is not changed on the display unit 103 when the plan is not changed even when the plan change date has come.

Further, after transmitting the capability change reservation notification, when the contract management server 121 receives a result notification as a response to the capability change reservation notification from the image forming apparatus 101 (S304), the contract management server 121 updates the contract data 211 (S305). Specifically, in the contract data 211, the plan selected from among the change plan candidates 422 is set in the item of the reserved plan 215 corresponding to the serial number selected on the contract information screen 411. In the contract data 211, the date designated in the plan change date input area 423 is set in the item of the plan change date 216 corresponding to the serial number selected in the contract information screen 411.

Figure 4D:
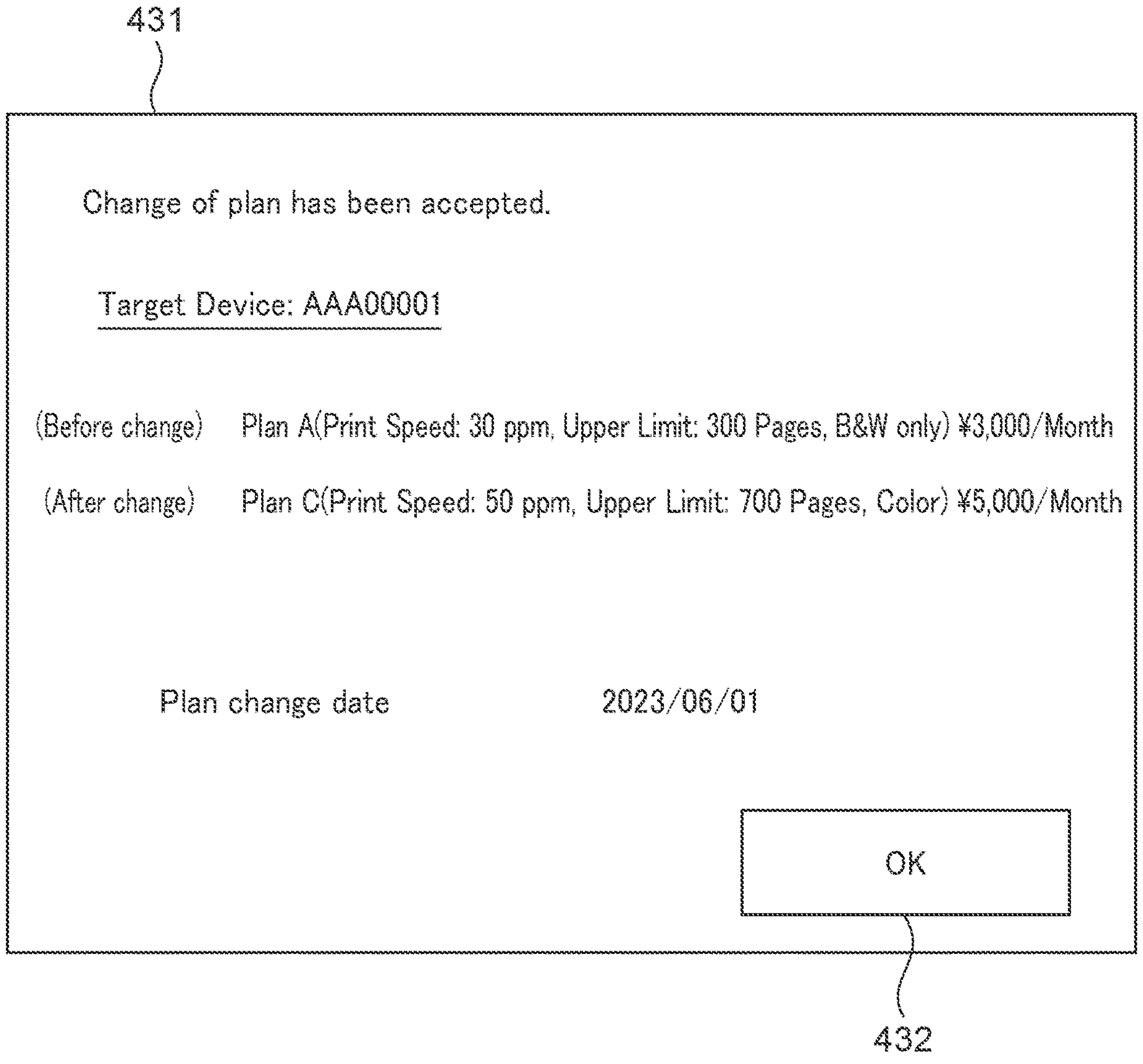

When the update of the contract data 211 is completed, the contract management server 121 transmits a plan change result notification indicating that acceptance of the change from the current plan contracted to the plan selected from among the change plan candidates 422 is completed to the PC 131 (S306). The WEB browser of the PC 131 that has received the plan change result notification displays a plan change normal end screen 431 shown in FIG. 4D. When the user presses an OK button 432 on the plan change normal end screen 431, the screen displayed on the WEB browser of the PC 131 is switched to the contract information screen 411 and the plan change accepting process is completed.

After completing the plan change accepting process, the contract management server 121 periodically performs a plan change date confirmation process (S307). In S307, it is confirmed whether the plan change date 216 has come for all the contract information registered in the contract data 211. For example, when the plan change date 216 of the contract information of the image forming apparatus 101 has come, the contract management server 121 transmits a capability change notification to the image forming apparatus 101 (S308). The capability change notification includes information indicating the type of the plan set in the reserved plan 215 of the contract information of the image forming apparatus 101. The capability change notification also includes the information about capabilities, such as a print speed, an upper limit number of print pages, and color print availability, which correspond to the plan.

The image forming apparatus 101 performs a capability change process of the image forming apparatus 101 based on the information included in the received capability change notification. The capability change process, the capabilities of the image forming apparatus 101 are changed to the capabilities indicated by the print speed, the upper limit number of print pages, and the color print availability of the printer unit 105 included in the received capability change notification. Thereafter, the image forming apparatus 101 transmits a result notification indicating the execution result of the capability change process to the contract management server 121 (S309).

When receiving the result notification, the contract management server 121 updates the contract data 211 (S310). In the S310, the value of the current plan 214 corresponding to the serial number selected on the contract information screen 411 is replaced with the value of the reserved plan 215, and the values of the reserved plan 215 and the plan change date 216 are cleared in the contract data 211. The value of the billed amount 217 corresponding to the serial number selected on the contract information screen 411 is changed to the billed amount corresponding to the current plan 214 updated. Thereafter, the contract information update process is terminated.

Figure 5:
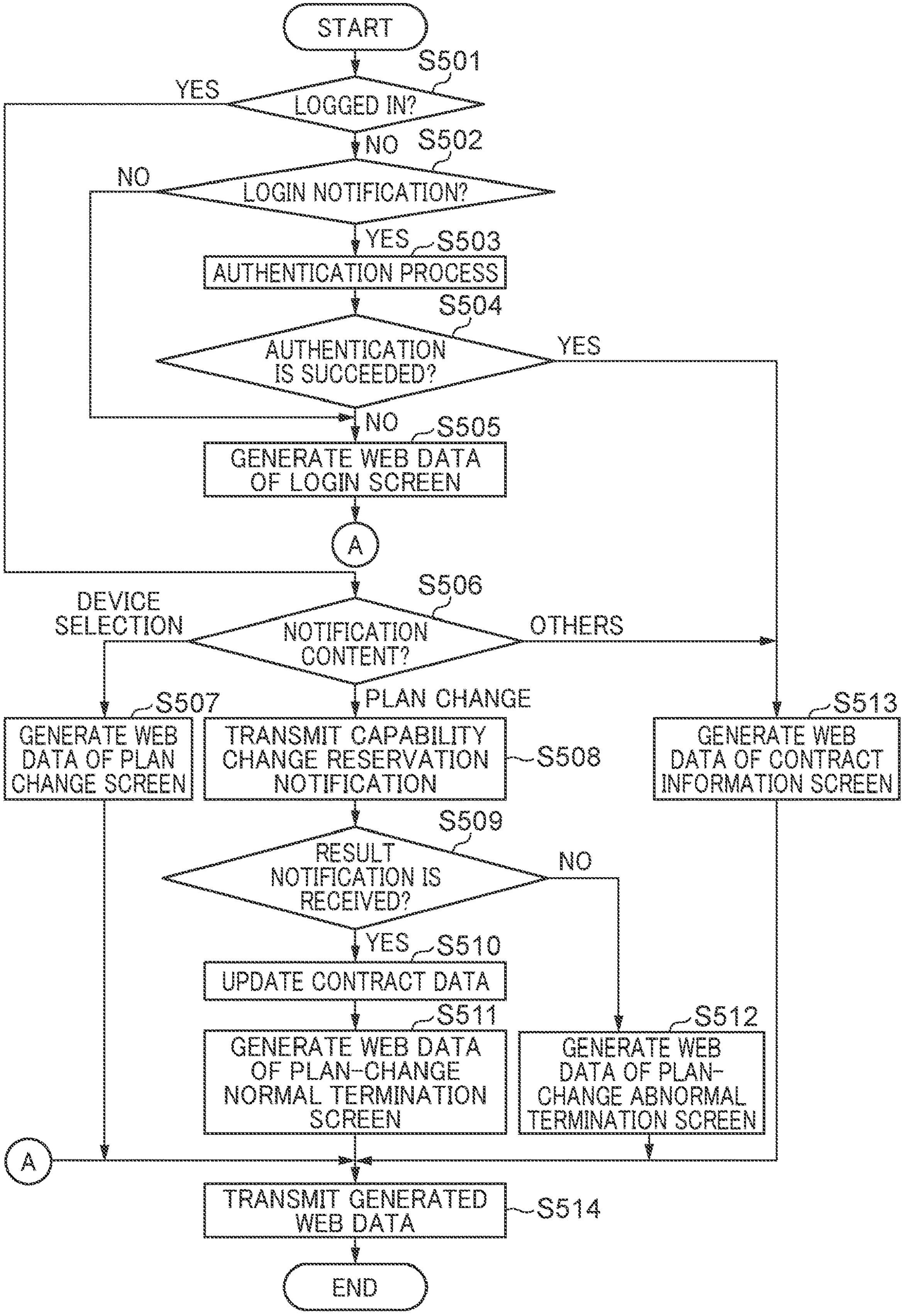
FIG. 5 is a flowchart showing a procedure of a plan change accepting process executed by the contract management server in FIG. 1.

FIG. 5 is a flowchart showing a procedure of the plan change accepting process executed by the contract management server 121 in FIG. 1. The plan change accepting process in FIG. 5 includes the process corresponding to S301 to S306 described above. The plan change accepting process in FIG. 5 is achieved by the CPU 122 of the contract management server 121 executing a program stored in the ROM 123 or the HDD 125. The plan change accepting process in FIG. 5 is started when the CPU 122 receives a process request from the WEB browser of the PC 131.

As shown in FIG. 5, first, the CPU 122 determines whether the user of the PC 131 is logged in to the contract information update service based on login session information notified from the WEB browser of the PC 131 (S501). When it is determined in S501 that the user of the PC 131 is not logged in to the contract information update service, the plan change accepting process proceeds to S502.

In S502, the CPU 122 determines whether the process request received from the WEB browser of the PC 131 is a login notification. The login notification is, for example, the login notification transmitted from the PC 131 in S301 described above. As described above, the login notification includes the user ID and the password input by the user on the login screen 401. When it is determined in S502 that the process request received from the WEB browser of the PC 131 is the login notification, the CPU 122 performs an authentication process (S503). In the authentication process, the CPU 122 respectively collates the user ID and the password included in the login notification with the user ID 202 and the password 203 in the user data 201. In addition, in S503, a process for holding the login session information used in the determination in S501 is also performed.

Then, the CPU 122 determines whether the authentication is succeeded (S504). When it is determined in S504 that the authentication has failed, the plan change accepting process proceeds to S505. In addition, when it is determined in S502 that the process request received from the WEB browser of the PC 131 is not the login notification, the plan change accepting process also proceeds to S505.

In S505, the CPU 122 generates WEB data of the login screen 401. Next, the CPU 122 transmits the generated WEB data to the PC 131 (S514). The login screen 401 is displayed on the WEB browser of the PC 131 that has received the WEB data. The user can perform a login operation on the login screen 401. After transmitting the WEB data generated in S505 to the PC 131 in S514, the plan change accepting process is completed.

When it is determined in S501 that the user of the PC 131 is logged in to the contract information update service, the plan change accepting process proceeds to S506. In S506, the CPU 122 determines the notification contents of the process request received from the WEB browser of the PC 131.

When it is determined in S506 that the notification content is neither the device selection nor the plan change (described as "others" in FIG. 5), the plan change accepting process proceeds to S513. In addition, when it is determined in S504 that the authentication is succeeded, the plan change accepting process proceeds to S513. In S513, the CPU 122 generates the WEB data of the contract information screen 411. Specifically, the CPU 122 obtains the information corresponding to the user ID of the user who is logging in to the contract information update service from among the plurality of pieces of information included in the contract data 211, and generates the WEB data of the contract information screen 411 based on the obtained information. The CPU 122 transmits the generated WEB data to the PC 131 in S514. The WEB browser of the PC 131 that has received the WEB data displays the contract information screen 411. The user can select the serial number of the image forming apparatus that the user wants to change contract contents on the contract information screen 411. After the WEB data that is generated in S513 is transmitted to the PC 131 in S514, the plan change accepting process is terminated.

When it is determined in S506 that the notification content is the device selection, that is, when the user presses the device selection button 413 in FIG. 4B, the plan change accepting process proceeds to S507. In S507, the CPU 122 generates the WEB data of the plan change screen 421. The CPU 122 transmits the generated WEB data to the PC 131 in S514. The plan change screen 421 is displayed on the WEB browser of the PC 131 that has received the Web page. The user can select, on the plan change screen 421, a plan to be changed to for the image forming apparatus corresponding to the serial number selected on the contract information screen 411. After the WEB data that is generated in S507 is transmitted to the PC 131 in S514, the plan change accepting process is terminated.

When it is determined in S506 that the notification content is a plan change, that is, when the user presses the plan change button 424 in FIG. 4C, the plan change accepting process proceeds to S508. In S508, the CPU 122 transmits the capability change reservation notification to the image forming apparatus 101 corresponding to the serial number selected on the contract information screen 411 (for example, see S303 described above). As described above, the capability change reservation notification includes the information included in the received notification (plan change notification). Specifically, the capacity change reservation notification includes the plan selected from among the change plan candidates 422 and the date designated in the plan change date input area 423. The capability change reservation notification also includes the information about capabilities, such as the print speed, the upper limit number of print pages, and the color print availability, which correspond to the plan.

Next, the CPU 122 determines whether a result notification that is a response to the capability change reservation notification is received from the image forming apparatus 101 (S509). When it is determined in S509 that the result notification is received from the image forming apparatus 101, the CPU 122 updates the contract data 211 in S510 (for example, see S305 described above). In S510, as described above, in the contract data 211, the plan selected from among the change plan candidates 422 is set in the item of the reserved plan 215 corresponding to the serial number selected on the contract information screen 411. In the contract data 211, the date specified in the plan change date input area 423 is set in the item of the plan change date 216 corresponding to the serial number selected in the contract information screen 411.

Next, the CPU 122 generates WEB data of the plan-change normal end screen 431 (S511). The CPU 122 transmits the plan change result notification to the PC 131 in S514 (for example, see S306 described above). The WEB browser of the PC 131 displays the plan change normal end screen 431 based on the received WEB data. After the WEB data generated in S511 and the plan change result notification are transmitted to the PC 131 in S514, the plan change accepting process is terminated.

Figure 4E:
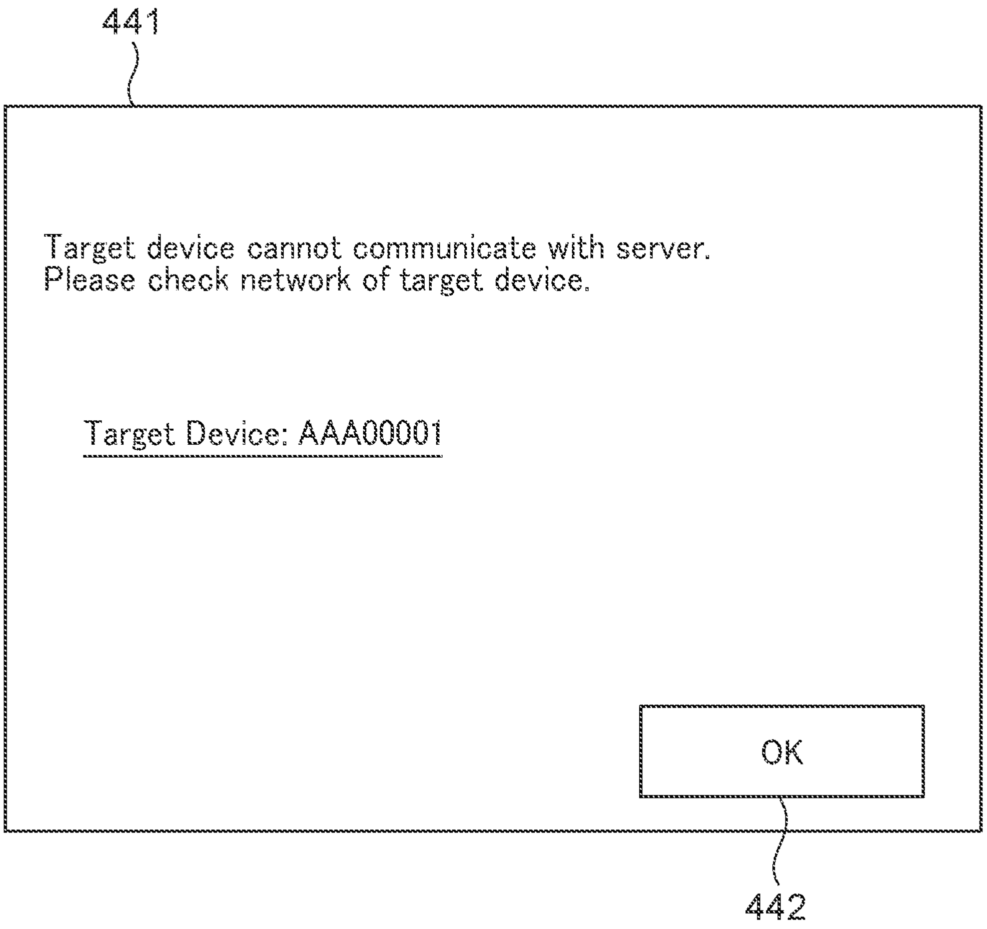

When it is determined in S509 that no result notification is received from the image forming apparatus 101 after elapsing a predetermined period, there is a concern that the image forming apparatus 101 is not connected to the network and is incommunicable with the contract management server 121. In this case, the plan change accepting process proceeds to S512. In S512, the CPU 122 generates WEB data of the plan change abnormal end screen 441 shown in FIG. 4E. The CPU 122 transmits the plan change result notification together with the WEB data to the PC 131 in S514. The WEB browser of the PC 131 displays the plan change abnormal end screen 441 based on the received WEB data. Since the communication with the image forming apparatus 101 is impossible, a warning message prompting the user to check the connection state of the image forming apparatus 101 is displayed on the plan change abnormal end screen 441. After the WEB data generated in S512 and the plan change result notification are transmitted to the PC 131 in S514, the plan change accepting process is terminated.

Figure 6:
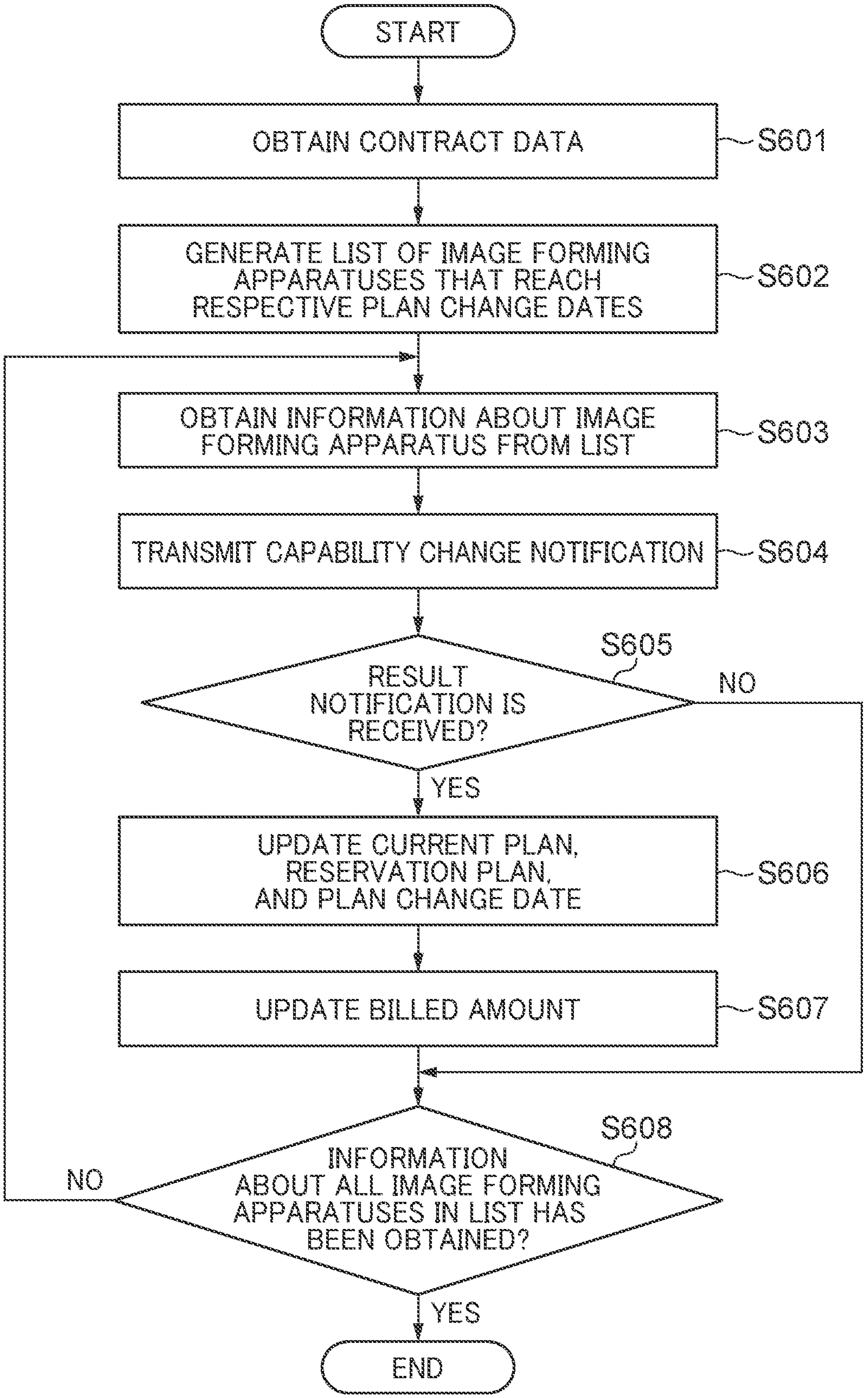
FIG. 6 is a flowchart showing a procedure of a plan change process executed by the contract management server in FIG. 1.

FIG. 6 is a flowchart showing a procedure of the plan change process executed by the contract management server 121 in FIG. 1. The plan change process in FIG. 6 includes the process corresponding to S307 to S310 described above. The plan change process is FIG. 6 is achieved by the CPU 122 of the contract management server 121 executing a program stored in the ROM 123 or the HDD 125. The plan change process in FIG. 6 is periodically executed once or more a day.

In FIG. 6, the CPU 122 obtains the contract data 211 (S601). Next, the CPU 122 performs the above-described plan change date confirmation process in S307, compares the current date with the plan change date 216 in the contract data 211, and specifies the image forming apparatus that has reached the plan change date. The CPU 122 generates a list of image forming apparatuses that have reached the respective plan change dates (S602). This list includes information about the image forming apparatuses that have reached the respective plan change dates among the information registered in the contract data 211. Next, the CPU 122 obtains in S603 the information about one image forming apparatus from the list generated in S602. For example, the CPU 122 obtains information about an image forming apparatus at the head of the list generated in S602. The CPU 122 transmits the capability change notification to the apparatus corresponding to the obtained information, for example, to the image forming apparatus 101 (S604). For example, see S308 described above. As described above, the capability change notification includes the information indicating the type of the plan set in the reserved plan 215 in the contract information of the image forming apparatus 101. The capability change notification also includes the information about capabilities, such as the print speed, the upper limit number of print pages, and the color print availability, which correspond to the plan.

Next, the CPU 122 determines whether a result notification that is a response to the capability change notification is received from the image forming apparatus 101 (S605). When it is determined in S605 that the result notification is received from the image forming apparatus 101, the CPU 122 updates the current plan 214, the reserved plan 215, and the plan change date 216 in the contract data 211 (S606). Specifically, the CPU 122 replaces the value of the current plan 214 with the value of the reserved plan 215, and clears the value of the reserved plan 215 and the value of the plan change date 216 in the contract information about the image forming apparatus 101 in the contract data 211.

The CPU 122 then updates the billed amount 217 in the contract data 211 (S607). Specifically, the CPU 122 updates the value of the billed amount 217 in the contract information about the image forming apparatus 101 in the contract data 211 to the billed amount corresponding to the updated plan. The plan change process then proceeds to S608. When it is determined in S605 that no result notification is received from the image forming apparatus 101 after elapsing the predetermined period, the plan change process also proceeds to S608.

In S608, the CPU 122 determines whether the information about all the image forming apparatuses in the list generated in S602 has been obtained. When it is determined in S608 that the information about any image forming apparatus in the list is not obtained, the plan change process returns to S603 and the CPU 122 obtains the information about the next image forming apparatus from the list generated in S602. In this way, in this embodiment, the capability change notification is transmitted to all the image forming apparatuses that have reached the respective plan change dates. In the meantime, when it is determined in S608 that the information about all the image forming apparatuses in the list has been obtained, the plan change process is terminated.

Figure 7:
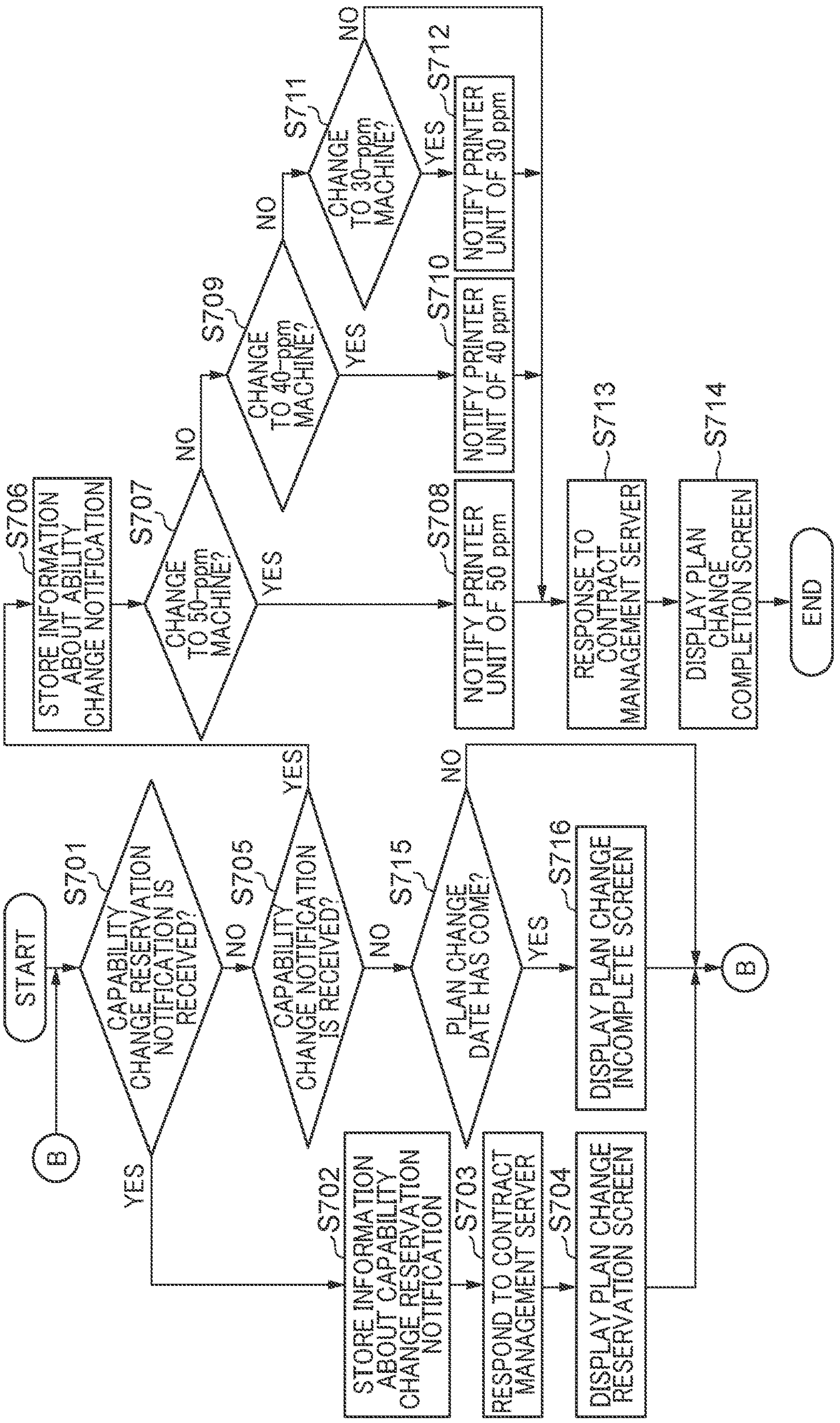
FIG. 7 is a flowchart showing a procedure of a plan change control process executed by the image forming apparatus in FIG. 1.

FIG. 7 is a flowchart showing a procedure of a plan change control process executed by the image forming apparatus 101 in FIG. 1. The plan change control process in FIG. 7 includes the process corresponding to S303, S304, S308, and S309 described above. The plan change control process in FIG. 7 is achieved by the CPU 107 of the image forming apparatus 101 executing a program stored in the ROM 108 or the HDD 110.

In FIG. 7, the CPU 107 first determines whether the capability change reservation notification is received from the contract management server 121 (S701). As described above, the capability change reservation notification includes the plan selected from the change plan candidates 422 and the date designated in the plan change date input area 423. The capability change reservation notification also includes the information about capabilities, such as the print speed, the upper limit number of print pages, and the color print availability, which correspond to the plan.

When it is determined in S701 that the capability change reservation notification is received from the contract management server 121, the CPU 107 stores the information included in the capability change reservation notification in the EEPROM 111 (S702). Management of the contract information and capability information in the image forming apparatus 101 will be described with reference to schematic views of FIG. 8A, FIG. 8B, and FIG. 8C. In the EEPROM 111 of the image forming apparatus 101, as shown in FIG. 8A, the contract information and capability information are managed as a current plan 801, a reserved plan 802, a plan change date 803, a print speed 804, a color mode 805, an upper limit number of print pages 806, and a number of used pages 807. The current plan 801, the reserved plan 802, and the plan change date 803 have the same contents as the current plan 214, the reserved plan 215, and the plan change date 216 of the contract data 211. The print speed 804, the color mode 805, and the upper limit number of print pages 806 constitute the capability information used during actual operation of the image forming apparatus. These correspond to the print speed, the color print availability, and the upper limit number of print pages per month in each contracted plan. The number of used pages 807 is the number of printed pages counted for each month. When the number of used pages 807 reaches the upper limit number of print pages 806, the user cannot execute printing in the month. In this embodiment, when a contract is made with any one of the plans A, B, and C, the contracted plan is set as the current plan 801 in the EEPROM 111, and the capabilities corresponding to the contracted plan are set in the print speed 804, the color mode 805, and the upper limit number of print pages 806. In FIG. 8A, as an example, the "plan A" is set in the current plan 801, "30 ppm" is set in the print speed 804, "B&W (Black and White) Only" is set in the color mode 805, "300 Pages" is set in the upper limit number of print pages 806, and "100 Pages" is set in the number of used pages 807.

Returning now to the description of S702. When the changed plan indicated by the capability change reservation notification received in S701 is the "plan C" and the plan change date is "2023 Jun. 1", the data in the EEPROM 111 is updated as shown in FIG. 8B according to the process in S702. Specifically, the reserved plan 802 is updated to the "plan C", and the plan change date 803 is updated to "2023 Jun. 1".

Figure 9A:
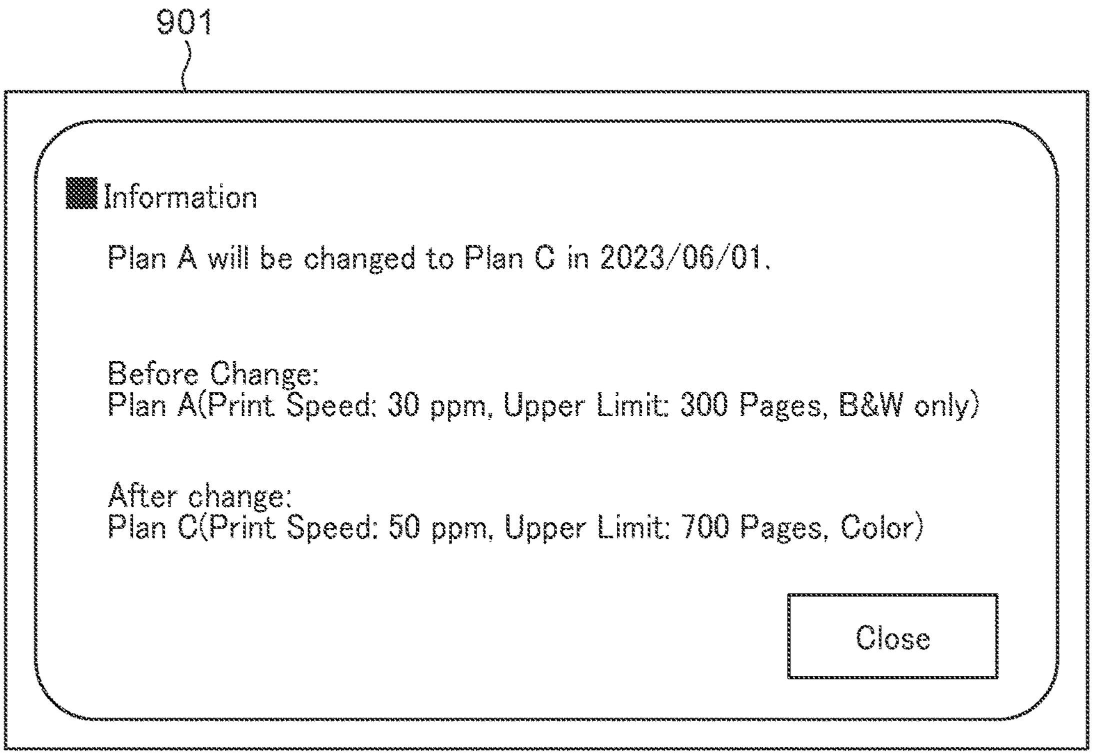
FIG. 9A, FIG. 9B, and FIG. 9C are views showing examples of screens displayed on a display unit of the image forming apparatus in FIG. 1.

Then, the CPU 122 responds to the contract management server 121 with a result notification (S703). Next, the CPU 122 controls to display a plan change reservation screen 901 in FIG. 9A on the display unit 103 according to the information stored in the EEPROM 111 (S704). The plan change reservation screen 901 displays information about a date on which the plan will be changed and a plan to which the current plan is changed. Then, the plan change control process returns to S701.

When it is determined in the S701 that no capability change reservation notification is received from the contract management server 121, the CPU 107 determines whether the capability change notification is received from the contract management server 121 (S705).

When it is determined in S705 that the capability change notification is received from the contract management server 121, the CPU 107 stores the information included in the capability change notification in the EEPROM 111 (S706). For example, when the changed plan indicated by the capability change notification is the "plan C", the current plan 801 is updated to the "plan C" and the reserved plan 802 is cleared as shown in FIG. 8C according to the process in S706. Further, the print speed 804, the color mode 805, and the upper limit number of print pages 806 are updated to values corresponding to the plan C, and the number of used pages 807 is cleared to 0.

Next, the CPU 107 determines whether the change is to a plan of a 50-ppm machine (S707). For example, when the print speed included in the capability change notification is 50 ppm, it is determined that the plan is changed to the plan of the 50-ppm machine. In the meantime, when the print speed included in the capability change notification is not 50 ppm, it is determined that the change is not to the plan of the 50-ppm machine.

When it is determined in S707 that the plan is changed to the plan of the 50-ppm machine, the CPU 107 notifies the printer unit 105 of 50 ppm (S708). Next, the plan change control process proceeds to S713 described later.

When it is determined in S707 that the change is not to the plan of the 50-ppm machine, the CPU 107 determines whether the change is to a plan of a 40-ppm machine (S709). For example, when the print speed included in the capability change notification is 40 ppm, it is determined that the plan is changed to the plan of the 40-ppm machine. In the meantime, when the print speed included in the capability change notification is not 40 ppm, it is determined that the change is not to the plan of the 40-ppm machine.

When it is determined in S709 that the plan is changed to the plan of the 40-ppm machine, the CPU 107 notifies the printer unit 105 of 40 ppm (S710). Next, the plan change control process proceeds to S713 described later.

When it is determined in S709 that the change is not to the plan of the 40-ppm machine, the CPU 107 determines whether the change is to a plan of a 30-ppm machine (S711). For example, when the print speed included in the capability change notification is 30 ppm, it is determined that the plan is changed to the plan of the 30-ppm machine. In the meantime, when the print speed included in the capability change notification is not 30 ppm, it is determined that the change is not to the plan of the 30-ppm machine.

When it is determined in S711 that the plan is changed to the plan of the 30-ppm machine, the CPU 107 notifies the printer unit 105 of 30 ppm (S712). Next, the plan change control process proceeds to S713 described later. When it is determined in S711 that the plan is not changed to the plan of the 30-ppm machine, the printer unit 105 is not notified of the print speed, and the plan change control process proceeds to S713.

Figure 9B:
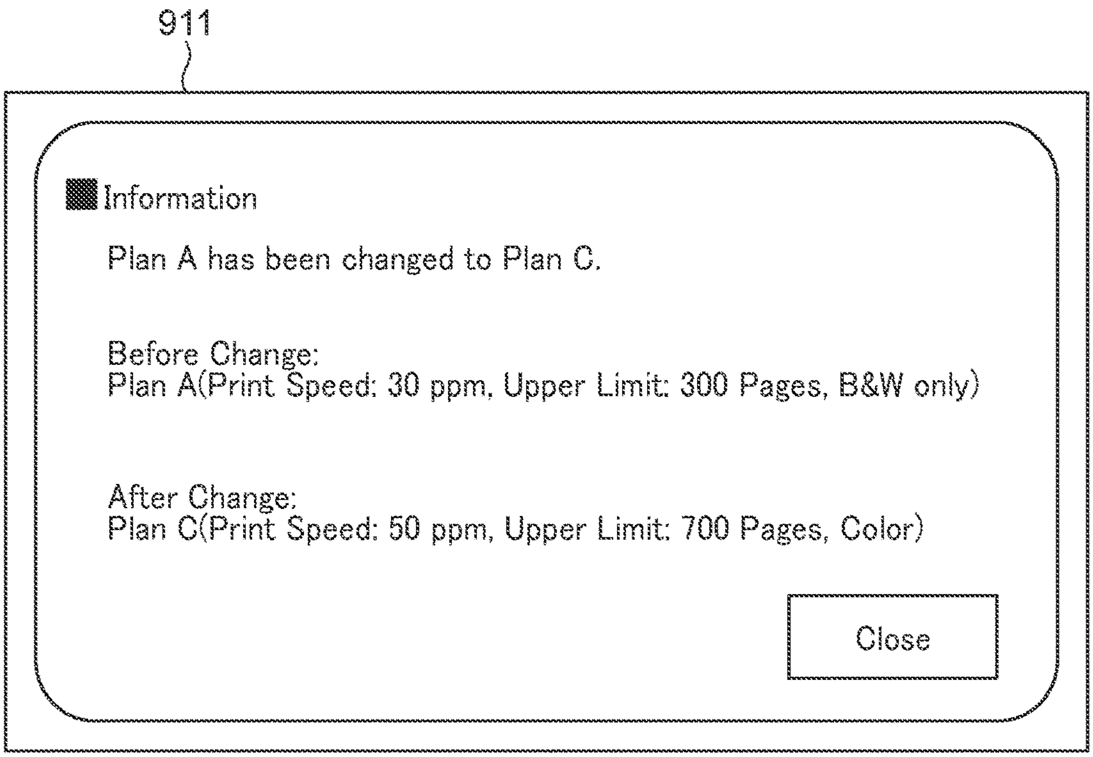

In S713, the CPU 107 responds to the contract management server 121 with the result notification (see S309, for example). Next, the CPU 107 displays a plan change completion screen 911 shown in FIG. 9B on the display unit 103 (S714) for notifying that the change of the plan is completed, and the plan change control process is terminated.

When it is determined in S705 that no capability change notification is received from the contract management server 121, the CPU 107 determines whether the current date has reached the date of the plan change date 803 stored in the EEPROM 111 (S715).

Figure 9C:
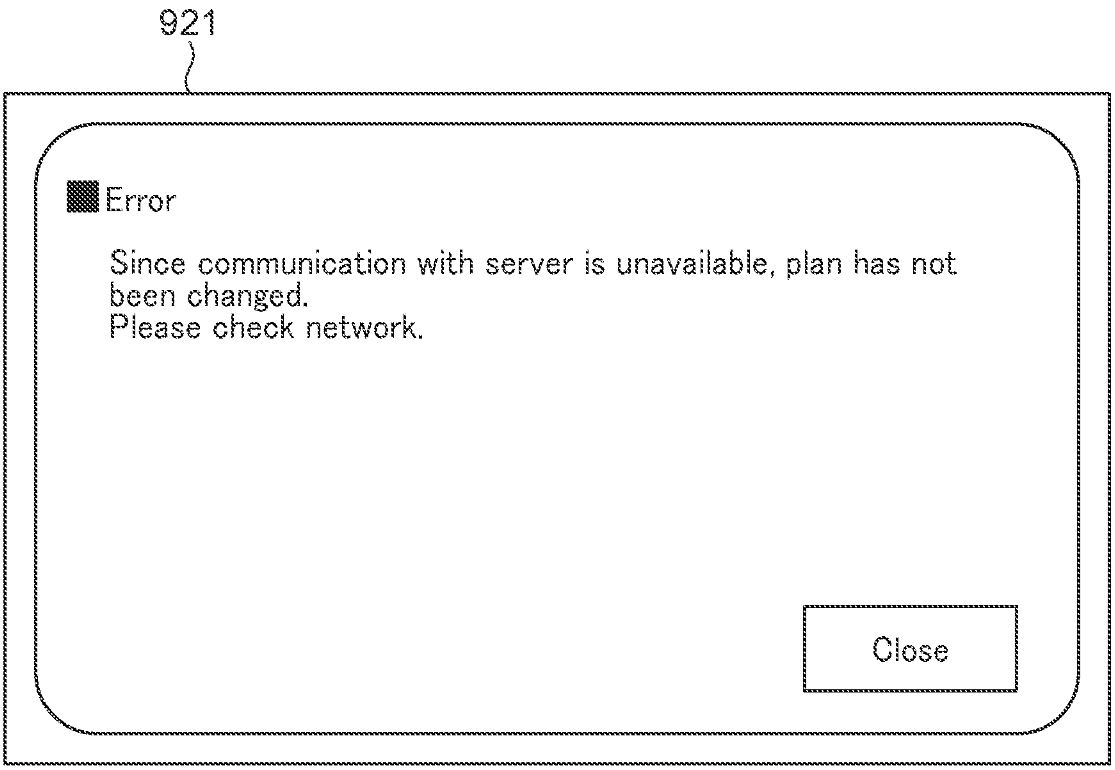

When it is determined in S715 that the current date has not reached the date of the plan change date 803, the plan change control process returns to S701. In the meantime, when it is determined in S715 that the current date has reached the date of the plan change date 803, the CPU 107 controls to display a plan change incomplete screen 921 shown in FIG. 9C on the display unit 103 (S716). The plan change incomplete screen 921 displays a fact that the change of the plan is not completed, its reason, etc. By displaying the plan change incomplete screen 921 on the display unit 103, the user can be notified that some action is required to complete the change of the plan. After the process in S716 is performed, the plan change control process returns to S701.

Figure 10:
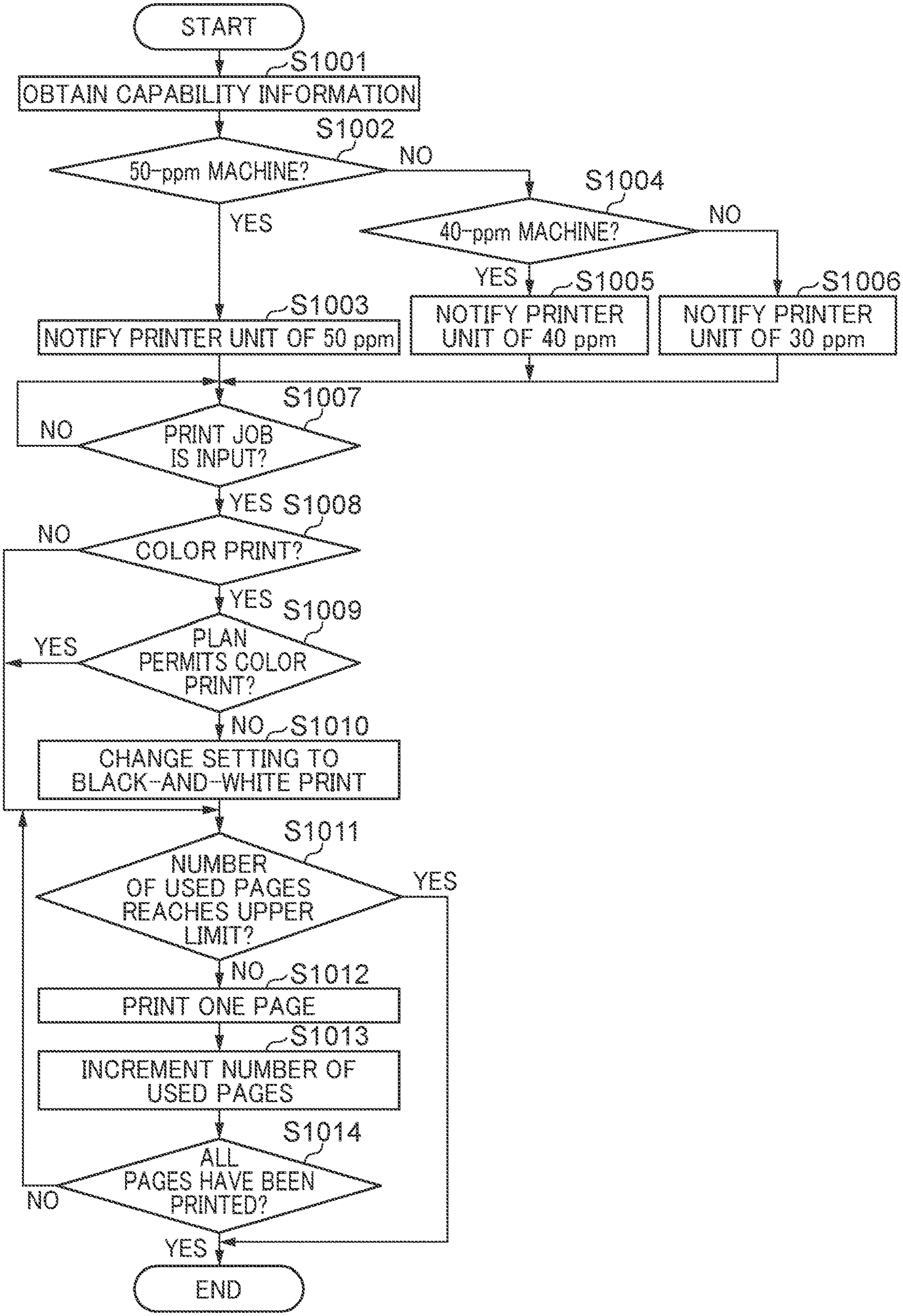
FIG. 10 is a flowchart showing a procedure of a print control process executed by the image forming apparatus in FIG. 1.

FIG. 10 is a flowchart showing a procedure of a print control process executed by the image forming apparatus 101 in FIG. 1. The print control process in FIG. 10 is achieved by the CPU 107 of the image forming apparatus 101 executing a program stored in the ROM 108 or the HDD 110.

In FIG. 10, the CPU 107 obtains the capability information stored in the EEPROM 111, in particular, the value of the print speed 804, the value of the color mode 805, and the value of the upper limit number of print pages 806 (S1001). Next, the CPU 107 determines whether the obtained capability information indicates the 50-ppm machine (S1002). For example, when the print speed 804 stored in the EEPROM 111 is 50 ppm, it is determined that the obtained capability information indicates the 50-ppm machine. When the print speed 804 stored in the EEPROM 111 is not 50 ppm, it is determined that the obtained capability information does not indicate the 50-ppm machine.

When it is determined in S1002 that the obtained capability information indicates the 50-ppm machine, the CPU 107 notifies the printer unit 105 of 50 ppm (S1003). Next, the print control process proceeds to S1007 described later.

When it is determined in S1002 that the obtained capability information does not indicate the 50-ppm machine, the CPU 107 determines whether the obtained capability information indicates the 40-ppm machine (S1004). For example, when the print speed 804 stored in the EEPROM 111 is ppm, it is determined that the obtained capability information indicates the 40-ppm machine. When the print speed 804 stored in the EEPROM 111 is not 40 ppm, it is determined that the obtained capability information does not indicate the 40-ppm machine.

When it is determined in S1004 that the obtained capability information indicates the 40-ppm machine, the CPU 107 notifies the printer unit 105 of 40 ppm (S1005). Next, the print control process proceeds to S1007 described later.

When it is determined in S1004 that the obtained capability information does not indicate the 40-ppm machine, the CPU 107 notifies the printer unit 105 of 30 ppm (S1006). Next, the print control process proceeds to S1007.

In S1007, the CPU 107 determines whether a print job is input. The CPU 107 waits until a print job is input. When a print job is input (YES in S1007), the CPU 107 determines whether the color print is set in the input print job (S1008).

When it is determined in S1008 that the color print is set for the input print job, the CPU 107 determines whether the contracted plan permits the color print based on the value of the color mode 805 stored in the EEPROM 111 (S1009). When it is determined in S1009 that the contracted plan does not permit the color print, that is, i.e., when the contracted plan permits only black-and-white print, the CPU 107 changes the setting of the print job to the black-and-white print (S1010). Next, the print control process proceeds to S1011.

When it is determined in S1008 that the color print is not set in the input print job or when it is determined in S1009 that the contracted plan permits the color print, the print control process proceeds to S1011 without executing the process in S1010.

In S1011, the CPU 107 determines whether the value of the number of used pages 807 stored in the EEPROM 111 reaches the upper limit number of print pages 806. When it is determined that the number of used pages 807 reaches the upper limit number of print pages 806 (YES in S1011), the print control process is terminated. When it is determined that the number of used pages 807 does not reach the upper limit number of print pages 806 (NO in S1011), the CPU 107 causes the printer unit 105 to print one page (S1012). Specifically, the CPU 107 transmits one page of print date to the printer unit 105. The printer unit 105 prints one page on the basis of the received print data. The printer unit 105 prints at the print speed notified in S1003, S1005, or S1006. Next, the CPU 107 counts up the value of the number of used pages 807 stored in the EEPROM 111 (S1013). Next, the CPU 107 determines whether all pages has been printed (S1014). When it is determined in S1014 that any page has not been printed, the print control process returns to S1011. When it is determined in S1014 that all pages has been printed, the print control process is terminated.

According to the above-described embodiment, when the plan change notification requesting a change from a contracted plan to another plan involving a change in the capability of the image forming apparatus 101 is received, a capability change notification is transmitted to the image forming apparatus 101. The capability change notification is a notification for changing the capability of the image forming apparatus 101 to the capability corresponding to the plan selected from among the change plan candidates 422. That is, when the user applies for switching to another plan involving a change in the capability of the image forming apparatus 101, it is unnecessary to physically transport another image forming apparatus having a different capability or issue a license for changing the capability to a different capability. This allows the user to easily use the image forming apparatus 101 having a desired capability.

In the above-described embodiment, the capability change notification is transmitted to the image forming apparatus 101 in response to the determination that the plan change date has come. This can change the capability of the image forming apparatus 101 to the capability corresponding to the plan selected from among the change plan candidates 422 on the plan change date.

In the above-described embodiment, the plan change result notification, which indicates that the acceptance of the change from the contracted plan to the plan selected from among the change plan candidates 422 is completed, is transmitted to the PC 131 that is the transmission source of the plan change notification in response to the acceptance of the plan change notification. This can notify the user who operates the PC 131 that the acceptance of the change from the contracted plan to the plan selected from among the change plan candidates 422 is completed.

In the above-described embodiment, the contract information about the image forming apparatus 101 in the contract data 211 is updated to the contract information corresponding to the plan selected from among the change plan candidates 422 in response to receiving the result notification that is a response to the capability change notification from the image forming apparatus 101. This can update the contract information managed by the contract management server 121 can be updated in association with the update of the capability of the image forming apparatus 101.

In the above-described embodiment, the billed amount is determined on the basis of the plan selected from among the change plan candidates 422. Thus, the user can be charged an appropriate amount of money corresponding to the changed plan.

In the above-described embodiment, the capabilities of the image forming apparatus 101 include the print speed of the printer unit 105. This allows the user to easily use the image forming apparatus 101 having a different print speed.

In the above-described embodiment, the capabilities of the image forming apparatus 101 include the color print availability. This allows the user to easily use the image forming apparatus 101 having different color print availability. For example, when the user changes the plan from the plan A that does not permit the color print to the plan B that permit the color print, the user can easily use the image forming apparatus 101 that permits the color print. In such a configuration, it is preferable that a toner cartridge set corresponding to the color print is mounted in advance in the image forming apparatus 101 in order to avoid the user from replacing the toner cartridge set after changing the plan.

In the above-described embodiment, the capability change notification includes the information indicating the type of the plan set in the reserved plan 215 of the contract information about the image forming apparatus 101, and the information about capabilities, such as the print speed, the upper limit number of print pages, and the color print availability, which correspond to the plan. This can notify the image forming apparatus 101 of the information about the capability corresponding to the plan designated by the user, and thus change the capability of the image forming apparatus 101 to the capability corresponding to the plan designated by the user.

Although the configuration in which the print speed of the printer unit 105 and the color print availability as the capabilities of the image forming apparatus 101 are changed has been described in this embodiment, the present invention is not limited to this configuration. For example, the reading speed of the scanner unit 106 may be changed. Such a configuration allows the user to easily use the image forming apparatus 101 having a different reading speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-065581, filed Apr. 13, 2023, which is hereby incorporated by reference herein in its entirety.

What is claimed is:

1. An information processing apparatus comprising:

a memory configured to store computer-executable instructions; and a processor configured to execute the computer-executable instructions stored in the memory to cause the information processing apparatus to:

hold contract information including information about a contracted plan selected by a user from among subscription plans that use an image forming apparatus;

receive a plan change notification requesting a change from the contracted plan to a different plan involving a change in a capability of the image forming apparatus; and transmit, in response to receiving the plan change notification requesting the change from the contracted plan to the different plan involving the change in the capability of the image forming apparatus, a capability change notification, for changing the capability of the image forming apparatus to a capability corresponding to the different plan, to the image forming apparatus.

2. The information processing apparatus according to claim 1, wherein the processor is configured to execute the computer-executable instructions stored in the memory to further cause the information processing apparatus to determine whether a date to change to the different plan has come, wherein the capability change notification is transmitted to the image forming apparatus after it is determined that the date to change to the different plan has come.

3. The information processing apparatus according to claim 2, wherein the processor is configured to execute the computer-executable instructions stored in the memory to further cause the information processing apparatus to transmit information included in the plan change notification to the image forming apparatus in response to acceptance of the plan change notification before the date to change to the different plan has come.

4. The information processing apparatus according to claim 1, wherein the processor is configured to execute the computer-executable instructions stored in the memory to further cause the information processing apparatus to transmit a notification indicating that acceptance of the change from the contracted plan to the different plan is completed to an apparatus that is a transmission source of the plan change notification in receiving the plan change notification.

5. The information processing apparatus according to claim 1, wherein the processor is configured to execute the computer-executable instructions stored in the memory to further cause the information processing apparatus to update the held contract information held by the holding unit based on information about the different plan in receiving a notification indicating that the change to the capability corresponding to the different plan is completed from the image forming apparatus.

6. The information processing apparatus according to claim 1, wherein a billed amount is determined based on the information about the different plan.

7. The information processing apparatus according to claim 1, further comprising a print unit configured to print image data on a sheet, and wherein the capability of the image forming apparatus includes a print speed of the print unit.

8. The information processing apparatus according to claim 7, wherein the capability of the image forming apparatus is-includes a capability relating to color print availability.

9. The information processing apparatus according to claim 1, further comprising a reading unit configured to read a document and generate image data of the document; and wherein the capability of the image forming apparatus includes a reading speed of the reading unit.

10. The information processing apparatus according to claim 1, wherein the capability change notification includes at least information about a capability corresponding to the different plan.

11. The information processing apparatus according to claim 1, wherein the processor is configured to execute the computer-executable instructions stored in the memory to further cause the information processing apparatus to:

determine whether a response to the transmitted capability change notification, for changing the capability of the image forming apparatus to the capability corresponding to the different plan, is received from the image forming apparatus; and update the held contract information based on information about the different plan in a first case where it is determined that the response to the transmitted capability change notification, for changing the capability of the image forming apparatus to the capability corresponding to the different plan, is received from the image forming apparatus.

12. The information processing apparatus according to claim 11, wherein the processor is configured to execute the computer-executable instructions stored in the memory to further cause the information processing apparatus to not update the held contract information based on the information about the different plan in a second case where it is determined that the response to the transmitted capability change notification, for changing the capability of the image forming apparatus to the capability corresponding to the different plan, is not received from the image forming apparatus.

13. The information processing apparatus according to claim 1, wherein the processor is configured to execute the computer-executable instructions stored in the memory to cause the information processing apparatus to transmit, in response to receiving the plan change notification requesting the change from the contracted plan to the different plan involving the change in the capability of the image forming apparatus, the capability change notification, for changing the capability of the image forming apparatus to the capability corresponding to the different plan, to the image forming apparatus without updating the held contract information based on information about the different plan before receiving a response, from the image forming apparatus, to the transmitted capability change notification for changing the capability of the image forming apparatus to the capability corresponding to the different plan.

14. A control method for an information processing apparatus, the control method comprising:

holding contract information including information about a contracted plan selected by a user from among subscription plans that use an image forming apparatus;

receiving a plan change notification requesting a change from the contracted plan to a different plan involving a change in a capability of the image forming apparatus; and transmitting, in response to receiving the plan change notification requesting the change from the contracted plan to the different plan involving the change in the capability of the image forming apparatus, a capability change notification, for changing the capability of the image forming apparatus to a capability corresponding to the different plan, to the image forming apparatus.

15. A non-transitory computer-readable storage medium storing a control program causing a computer to execute a control method for an information processing apparatus, the control method comprising:

holding contract information including information about a contracted plan selected by a user from among subscription plans that use an image forming apparatus;

receiving a plan change notification requesting a change from the contracted plan to a different plan involving a change in a capability of the image forming apparatus; and transmitting, in response to receiving the plan change notification requesting the change from the contracted plan to the different plan involving the change in the capability of the image forming apparatus, a capability change notification, for changing the capability of the image forming apparatus to a capability corresponding to the different plan, to the image forming apparatus.

16. A management system comprising:

a management server that manages an image forming apparatus, the management server comprising:

a memory configured to store computer-executable instructions; and a processor configured to execute the computer-executable instructions stored in the memory to cause the information processing apparatus to:

hold contract information including information about a contracted plan selected by a user from among subscription plans that use an image forming apparatus;

receive a plan change notification requesting a change from the contracted plan to a different plan involving a change in a capability of the image forming apparatus; and transmit, in response to receiving the plan change notification requesting the change from the contracted plan to the different plan involving the change in the capability of the image forming apparatus, a capability change notification, for changing the capability of the image forming apparatus to a capability corresponding to the different plan, to the image forming apparatus; and the image forming apparatus comprising:

a memory configured to store computer-executable instructions; and a processor configured to execute the computer-executable instructions stored in the memory to cause the image forming apparatus to:

change the capability of the image forming apparatus to the capability corresponding to the different plan based on the capability change notification received.

17. The management system according to claim 16, further comprising a communication device configured to accept an instruction to change from the contracted plan to the different plan from a user and to transmit the plan change notification.

18. The management system according to claim 16, wherein the image forming apparatus comprises is further caused to accept an instruction to change from the contracted plan to the different plan from a user and to transmit the plan change notification.

* * * * *